United States Patent
Thomas et al.

(10) Patent No.: US 7,657,709 B2
(45) Date of Patent: Feb. 2, 2010

(54) DATA PROCESSING SYSTEM AND METHOD OF CACHE REPLACEMENT

(75) Inventors: Bijo Thomas, Kottayam (IN); Sainath Karlapalem, Bangalore (IN)

(73) Assignee: ST-Ericsson SA, Plan-les-Ouates (CH)

( * ) Notice: Subject to any disclaimer, the term of this patent is extended or adjusted under 35 U.S.C. 154(b) by 353 days.

(21) Appl. No.: 11/815,764

(22) PCT Filed: Jan. 27, 2006

(86) PCT No.: PCT/IB2006/050307
§ 371 (c)(1),
(2), (4) Date: Aug. 7, 2007

(87) PCT Pub. No.: WO2006/082551
PCT Pub. Date: Aug. 10, 2006

(65) Prior Publication Data
US 2008/0147983 A1    Jun. 19, 2008

(30) Foreign Application Priority Data
Feb. 7, 2005    (EP) .................................. 05100821

(51) Int. Cl.
*G06F 12/00*    (2006.01)
(52) U.S. Cl. ........................ 711/133; 710/240
(58) Field of Classification Search ........................ None
See application file for complete search history.

(56) References Cited

U.S. PATENT DOCUMENTS

| | | | |
|---|---|---|---|
| 5,632,013 A | * | 5/1997 | Krygowski et al. ............. 714/7 |
| 5,809,314 A | * | 9/1998 | Carmean et al. ............. 713/322 |
| 6,163,857 A | * | 12/2000 | Meaney et al. ................. 714/7 |

FOREIGN PATENT DOCUMENTS

GB    2366634 A    3/2002

OTHER PUBLICATIONS

Chandrakasan; et al "Minimizing Power Consumption in CMOS Circuits" Proceedings of the IEEE, vol. 83, No. 4, Apr. 1995 pp. 498-523.
M. Kandemir; et al "Reducing Cache Access Energy in Array-Intensive Applications" Proceedings 2002 Design, Automation and Test in Europe Conference and Exhibition 2002 Paris, France pp. 1092.
K. Inoue; et al "A High-Performance/Low-Power On-Chip Memory-Path Architechture With Variable Cache-Line Size" IEICE Transactions on Electronics, vol. E83-C, No. 11, Nov. 2002 pp. 1716-1723.
"Low Power-Cache Replacement Algorithm" Research Disclosure RD-408050, vol. 408, No. 50, Apr. 1998.

* cited by examiner

*Primary Examiner*—Brian R Peugh
(74) *Attorney, Agent, or Firm*—Robert Iannucci; Seed IP Law Group PLLC

(57) ABSTRACT

A data processing system is provided comprising at least one processing unit for processing data; a memory means for storing data; and a cache memory means for caching data stored in the memory means. Said cache memory means is associated to at least one processing unit. An interconnect means is provided for connecting the memory means and the cache memory means. The cache memory means is adapted for performing a cache replacement based on reduced logic level changes of the interconnect means as introduced by a data transfer between the memory means and the cache memory means.

7 Claims, 1 Drawing Sheet

DATA PROCESSING SYSTEM AND METHOD OF CACHE REPLACEMENT

FIELD OF THE INVENTION

The present invention relates to a data processing system, an electronic device and a method of cache replacement.

DESCRIPTION OF THE RELATED ART

With the increasing availability and success of portable devices like PDA, notebooks, mobile phones, portable MP3-player etc. the power consumption of these devices has become more and more important within modern integrated circuits and the design thereof and a considerable amount of investigation and design efforts have been conducted to reduce the power consumption. As the VLSI design of ICs used in such devices is shifting into the nanometer domain, the energy which is dissipated by the interconnect in a system-on-chip becomes a significant part of the overall system power consumption. Furthermore, a limiting factor for reducing the weight and size of portable devices correlate to the amount of batteries which are required to provide the power dissipated by the electronic circuits within the portable devices.

The power consumption of the interconnect, i.e. the bus or the network, is not only based on the physical properties of the interconnect, like the voltage swing, the wire delay, the topography of the interconnect or the like, but also on the data flow in the system-on-chip, i.e. the processor-processor communication and the processor-memory communication. This communication can be of the following origins: cache and memory transactions (data fetch from shared memory), cache coherence operations (updated data in a shared memory must be updated in all cache copies resulting in synchronization traffic), write back during cache victimization, packet segmentation overheads (segmenting dataflow into packets will introduce an additional data overhead) or contentions between packets (re-routing packets in case of a contention).

In "Low Power-Cache Replacement Algorithm" in Research disclosure, RD-4008050, April 1998, a method for minimizing a power dissipation resulted from bit changes in the content of a tag RAM during cache replacement is described.

SUMMARY

It is an object of the invention to reduce the power consumption within a data processing system or an electronic circuit comprising a plurality of processing units.

This object is solved by a data processing system according to claim 1, an electronic device according to claim 6 and a method of cache replacement according to claim 7.

Therefore, data processing system is provided comprising at least one processing unit for processing data, a memory means for storing data; and a cache memory means for caching data stored in the memory means. Said cache memory means is associated to at least one processing unit. An interconnect means is provided for connecting the memory means and the cache memory means. The cache memory means is adapted for performing a cache replacement based on reduced logic level changes of the interconnect means as introduced by a data transfer between the memory means and the cache memory means.

According to an aspect of the invention, said cache memory means comprises a plurality of cache lines and a cache controller for selecting those cache lines to be evicted based on the hamming distance between the values of the data send last and the data to be sent next over the interconnect means. Therefore, this provides an easy method for determining the minimum logic level changes in the interconnect.

According to a further aspect of the invention, the cache controller comprises an enabling/disabling unit for enabling/disabling the cache replacement optimized for power consumption. Accordingly, the cache replacement being optimized for power consumption can be disabled if time critical applications are to be processed by the data processing system.

The invention is also related to an electronic circuit comprising at least one processing unit for processing data, a memory means for storing data; and a cache memory means for caching data stored in the memory means. Said cache memory means is associated to at least one processing unit. An interconnect means is provided for connecting the memory means and the cache memory means. The cache memory means is adapted for performing a cache replacement based on reduced logic level changes of the interconnect means as introduced by a data transfer between the memory means and the cache memory means.

The invention further relates to a method of cache replacement within a cache memory means associated to at least one processing unit. The cache memory means is adapted for caching data stored in a memory means. The memory means and the cache memory means are connected by an interconnect means. A cache replacement within the cache memory means is preformed based on reduced logic level changes of the interconnect means as introduced by a data transfer between the memory means and the cache memory means.

The invention is based on the idea to perform a cache replacement based on reduced or minimum logic level changes of an interconnect between a memory and a cache.

BRIEF DESCRIPTION OF THE DRAWINGS

These and other aspects of the invention are apparent from and will be elucidated with reference to the embodiments described hereinafter.

DETAILED DESCRIPTION OF EMBODIMENTS

Figure 1:
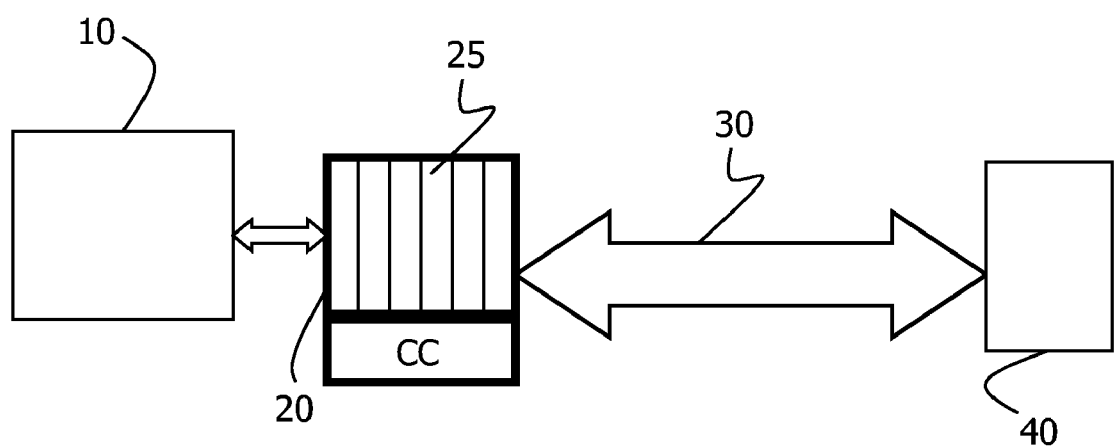
FIG. 1 shows a block diagram of a basic architecture of a system on chip according to the invention.

FIG. 1 shows a block diagram of a basic architecture of a system on chip according to the invention. Such a system on chip may be implemented as or on an electronic device or a data processing system. The system on chip comprises at least one processing unit 10 (only one processing unit is depicted), a cache means 20 associated to the processing unit 10. The cache means 20 is connected to a memory 40 via a bus 30. The cache 20 serves to cache data from the memory, i.e. those data items, which will be needed during upcoming processing cycles are fetched from the memory before their actual processing.

The cache means 20 comprises m cache lines 25 or cache blocks as well as cache controller CC. The m cache line 25 may comprise the data D1, D2, . . . Dm. The last data D0 which has been read from or has been written to the cache lines 25 is stored in the cache controller CC or in the cache means 20.

Once a cache miss has occurred, a cache controller CC has to select the data item or the block currently stored in the cache, which is to be replaced with the desired data item or data block to be fetched. The actual cache replacement can be performed on a randomly basis, a least-recently used LRU basis or on a first in, first out FIFO basis. A further cache replacement policy is the least-frequently used technique; wherein the least-frequently used block is evicted from the cache to create space for newly prefetched data.

Regarding the cache replacement techniques two issues appear to be important, namely which data block should be fetched into the cache and which data block should be evicted from the cache such that the newly fetched data block can be stored in the cache instead of the evicted data block.

The cache controller CC selects one of the cache lines 25 with data D1-Dm which transfer over the interconnect 30 will result in reduced or minimum logic level changes. The cache controller CC compares the content of the data D1-Dm with the content of the data D0 which was transferred last over the bus, i.e. the interconnect 30. Once the respective cache line 25 and its corresponding data is selected, this cache line 25 is victimized and evicted. This is preformed by determining the hamming distance between the content of the data D0, i.e. the data previously being transferred to/from the cache 20 over the bus 30, and the content of the data D1-Dm which is to be evicted and transferred over the bus 30. The cache controller CC optionally comprises a victim buffer for storing the previously victimized (write-back) data such that its content can be compared to the contents of the cache lines 25 of the cache 20.

A hamming distance corresponds to the minimum number of bits that have to be changed in order to convert one bit string into another. If x and y are two binary sequences of the same length, the hamming distance between these two sequences is the number of symbols that do not correspond to each other. For example, if x=10000110 and y=01101000, then the hamming distance is the number of bits which change from x to y. Here, this number is 6.

If the cache 20 comprises 4 cache lines 25, then the cache lines 25 comprise data D1-D4. If new data is to be read into the cache one of the four cache lines 25 must be victimized and evicted. If the case is considered that the last evicted (and transferred over the bus 30) data is D0, then the cache controller CC determines the hamming function.

$h(D0, D_i)$, where $D_i=D1, D2, \ldots, D_m$ (m=4 in this example) such that bit changes between D0 and $D_i$ are minimum. The cache line 25 whose data ($D_i$) results in minimum hamming distance is selected for victimization and can be transferred over the bus.

For example, if D0=10101010 and D1=11110000
D2=01010101
D3=10001010
D4=00110001

Here, the hamming distance is h (D0, D1)=4, h (D0, D2)=8, h (D0, D3)=1, h (D0, D4)=5, respectively. Hence, the cache line which is victimized and transferred over the bus corresponds to the data D3.

Optionally, a memory mapped input output MMIO register is arranged in the cache controller CC. This register is used to enable/disable the above-mentioned victimization scheme based on reducing the power consumption. This power-saving victimization scheme is activated if an application is to be processed with calculations which are not time-critical. However, if an application is to be processed which comprises time-critical calculations, the cache victimization scheme for reducing the power consumption can be disabled or switched off for a predetermined period of time or as long as the time-critical application is processed. Thereafter, the power reducing victimization scheme may be enabled or switched on again. The status of the power reducing victimization scheme may be stored in the MMIO register. Accordingly, the power-saving cache victimization scheme can be combined with other conventional cache replacement schemes. Depending on the criticality of the application, this mode can be switched off/on.

Reducing the logic level changes on a bus reduces the power consumption in the overall electrical circuit, as the overall power consumption of a bus is dominated by the power consumption during the switching of the logic levels of the bus. The power consumption due to the changes in logic level are dependent on the clock rate, the supply voltage, the node capacitance and the average number of times in each clock cycle that a node will make a power consumption transition from 0 to 1 or from 1 to 0. For more information regarding the power consumption of a bus please refer to "Minimizing power consumption in CMOS circuits" by Chandrakasan et al., in Proc. of the IEEE, Vol. 83, no. 4, April 1995.

Although the additionally required circuitry for the cache victimization may consume a certain amount of power, this amount will be significantly less as compared to the power consumption save by reducing the switching in the bus lines.

The above mentioned system on chip may be implemented in portable devices like mobile phones, PDA etc.

It should be noted that the above-mentioned embodiments illustrate rather than limit the invention, and that those skilled in the art will be able to design many alternative embodiments without departing from the scope of the appended claims. In the claims, any reference signs placed between parenthesis shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. Data processing system, comprising: at least one processing unit for processing data; a memory means for storing data; a cache memory means for caching data stored in the memory means, said cache memory means being associated to at least one processing unit; an interconnect means for connecting the memory means and the cache memory means; wherein the cache memory means is adapted for performing a cache replacement based on reduced logic level changes of the interconnect means as introduced by a data transfer between the memory means and the cache memory means.

2. Data processing system according to claim 1, wherein the cache memory means comprising a plurality of cache lines; and a cache controller for selecting cache lines to be evicted based on the hamming distance between the values of the data transferred last and the data to be transferred next over the interconnect means.

3. Data processing system according to claim 2, wherein the cache controller comprises an enabling/disabling unit for enabling/disabling the cache replacement optimized for power consumption.

4. Data processing system according to claim 3, wherein the enabling/disabling unit is memory mapped input/output register.

5. Data processing system according to claim 1, wherein said cache replacement is performed by comparing the last transferred data with data to be transferred over the interconnect means to determine a sequence of cache replacements which in total reduce the required power dissipation.

6. Electronic device, comprising: at least one processing unit for processing data; a memory means for storing data; a cache memory means for caching data stored in the memory means, said cache memory means being associated to at least one processing unit; an interconnect means for connecting the memory means and the cache memory means; wherein the cache memory means is adapted for performing a cache replacement based on reduced logic level changes of the interconnect means as introduced by a data transfer between the memory means and the cache memory means.

7. Method of cache replacement within a cache memory means associated to at least one processing unit; the cache memory means being adapted for caching data stored in a memory means, the memory means and the cache memory means being connected by an interconnect means; wherein a cache replacement within the cache memory means is preformed based on reduced logic level changes of the interconnect means as introduced by a data transfer between the memory means and the cache memory means.

* * * * *